United States Patent
Werner et al.

(10) Patent No.: US 11,034,455 B2
(45) Date of Patent: Jun. 15, 2021

(54) RAIL SYSTEMS FOR FIXING FITTINGS IN A CABIN OF A VEHICLE

(71) Applicant: Airbus Operations GmbH, Hamburg (DE)

(72) Inventors: Sven Werner, Hamburg (DE); Andre Zybala, Hamburg (DE); Wolfgang Eilken, Hamburg (DE); Memis Tiryaki, Hamburg (DE)

(73) Assignee: Airbus Operations GmbH

( * ) Notice: Subject to any disclaimer, the term of this patent is extended or adjusted under 35 U.S.C. 154(b) by 0 days.

(21) Appl. No.: 16/574,607

(22) Filed: Sep. 18, 2019

(65) Prior Publication Data

US 2020/0094969 A1    Mar. 26, 2020

(30) Foreign Application Priority Data

Sep. 21, 2018   (DE) ..................... 10 2018 123 251.9

(51) Int. Cl.
   *B64D 11/06*   (2006.01)

(52) U.S. Cl.
   CPC ................ *B64D 11/0696* (2013.01)

(58) Field of Classification Search
   CPC ....... B64D 11/0696; B64D 11/06; B64C 1/20; B60N 2/005; B60N 2/07; B60N 2/02
   USPC ............. 248/188.9, 503.1; 244/118.1, 118.6, 244/122 R
   See application file for complete search history.

(56) References Cited

U.S. PATENT DOCUMENTS

| 5,807,052 A | * | 9/1998 | Van Boven | F16B 41/002 |
| | | | | 411/353 |
| 8,282,326 B2 | | 10/2012 | Krostue et al. | |
| 9,663,231 B2 | | 5/2017 | Koncz | |
| 10,654,573 B2 | * | 5/2020 | Movsesian | B60N 2/015 |
| 2007/0063122 A1 | * | 3/2007 | Bowd | B64D 11/0696 |
| | | | | 248/429 |
| 2009/0230241 A1 | | 9/2009 | Heller et al. | |
| 2009/0236471 A1 | * | 9/2009 | Frantz | B64C 1/20 |
| | | | | 244/118.1 |
| 2014/0306060 A1 | * | 10/2014 | Schomacker | B64D 11/0696 |
| | | | | 244/118.6 |
| 2017/0158334 A1 | * | 6/2017 | Wolgast | B64C 1/20 |
| 2019/0092478 A1 | * | 3/2019 | Gilbert | B64D 11/0696 |
| 2019/0233080 A1 | * | 8/2019 | Rekert | B64D 11/0696 |

(Continued)

FOREIGN PATENT DOCUMENTS

| DE | 10252886 A1 | 6/2004 |
| DE | 102009018487 A1 | 11/2009 |

(Continued)

*Primary Examiner* — Muhammad Ijaz
(74) *Attorney, Agent, or Firm* — Lerner, David, Littenberg, Krumholz & Mentlik, LLP (57) ABSTRACT

A rail system for fixing fittings in a cabin of a vehicle includes a first elongate rail body with a fixing side for fixing to a vehicle structure, an opposite support side with a support surface for receiving fittings, and a rail cross-section extending between the fixing side and the support side, and several fixing inserts which can be fixed along the support surface. The rail cross-section has two mutually opposing legs which are spaced apart from each other and run perpendicularly to the support surface, and the fixing inserts are configured so as not to protrude beyond the support surface.

20 Claims, 4 Drawing Sheets

(56) References Cited

U.S. PATENT DOCUMENTS

2019/0257331 A1\* 8/2019 Benthien .................. F16B 5/12
2020/0086968 A1\* 3/2020 Roth ........................ B64C 1/18

FOREIGN PATENT DOCUMENTS

DE      102004040328 B4   8/2013
EP           2837555 A1   2/2015

\* cited by examiner

RAIL SYSTEMS FOR FIXING FITTINGS IN A CABIN OF A VEHICLE

FIELD OF THE INVENTION

The invention concerns a rail system for fixing fittings in a cabin of a vehicle, and a vehicle with a cabin and at least one such rail system installed therein.

BACKGROUND OF THE INVENTION

Rail systems for fixing fittings in a cabin of a vehicle are known. These are usually installed in a longitudinal extent of the cabin and, by means of a matrix-style top side, allow the arrangement and locking of fixing means which are connected to the fittings to be installed. In passenger aircraft, the seat or floor rails known as ATLAS rails are normally installed; these have a flat strip-like cavity on their top side which, via an elongate slot and openings through this, can receive locking bodies serving for fixing.

For the installation of fittings which do not include seats or seat frames, other facilities may be required. Floor rails may be interrupted in this region, or the fittings may be coupled with conventional locking bodies so they can be attached to seat rails. It is also conceivable that the floor rails are simply covered, while the fittings are attached at dedicated points. With this variant, some of the structural loads may indeed be transmitted to the floor rails, but both additional expense and higher weight are required.

BRIEF SUMMARY OF THE INVENTION

Aspects of the invention may propose a particularly flexible solution for fixing fittings in a cabin of a vehicle, which is easily adapted to the fittings to be retained and causes no or only a slight additional weight.

A rail system is proposed for fixing fittings in a cabin of a vehicle, comprising a first elongate rail body with a fixing side for fixing to a vehicle structure, an opposite support side with a support surface for receiving fittings, and a rail cross-section extending between the fixing side and the support side, and several fixing inserts which can be fixed along the support surface. The rail cross-section has two mutually opposing legs which are spaced apart from each other and run perpendicularly to the support surface. The fixing inserts are configured so as not to protrude beyond the support surface.

The first elongate rail body should be regarded as a necessary basis with which the several different rails can be created. The first rail body is preferably totally straight and has a specific rail cross-section. This is preferably constant along the entire length of the first rail body.

The first rail body is characterized by a fixing side and a support side. The fixing side is intended for mounting the rail body on the vehicle structure. For this, the rail cross-section may have a particular shape which simplifies the fixing to the vehicle structure.

It is furthermore proposed that the rail cross-section provides at least one support surface and has two legs which are spaced apart from each other and each run perpendicularly to the support surface. The support surface is the support on or against which a component to be installed may be placed, as will be explained below. The rail cross-section with the two legs is accordingly designed as an inverted U shape, wherein in the installed state, the support side is arranged above the fixing side.

The rail cross-section with the two legs spaced apart from each other may achieve a high geometrical moment of inertia about axes perpendicular to the legs. Also, fixing means can very easily be pushed through the support surface in order to be connected to corresponding fixing means below the support surface, i.e. between the legs. Because the legs are spaced apart from each other, the support surface is also stabilized and can withstand even greatly asymmetric loading.

The individual fixing inserts are intended to be able to fix specific fittings to the support surface. The fixing inserts are distributed on the support surface at approximately regular intervals or following a matrix pattern, and are situated in corresponding receiving bores. They may each have an opening for receiving screw fittings or similar. The fixing inserts preferably do not protrude beyond the support surface so that even totally flush fittings can be attached to the support surface.

The rail system according to an embodiment of the invention may be used in particular for mounting attachments in vehicles intended for passenger transport, in a cabin integrated therein. The support surface may also be used to receive larger fittings, i.e. monuments or similar. These may for example be toilets, galley modules, stowage cupboards or similar.

Secondly however, rail attachments are also conceivable for attaching to the first elongate rail body. These rail attachments, which could be described as second elongate rail bodies, preferably have a flat base surface. Via this, they can be laid flush on the support surface. Consequently, a conventional seat rail can be produced from the elongate first rail body when a corresponding rail attachment is applied. Other rail attachments, which could e.g. provide a slide rail, are also conceivable.

To summarize, the rail system according to an embodiment of the invention forms a particularly flexible and robust basis for various fixing types in a cabin of a vehicle. By using the above-mentioned profile cross-section, a high mechanical stability can be achieved which allows individual configuration of the cabin and can be fixedly mounted in the vehicle before the cabin is specifically fitted out. Due to the high stability, the rail body may also at least partially fulfil tasks of a vehicle structure, so that slightly lower requirements may be imposed on additional reinforcements, for example a floor structure.

Preferably, the legs each have a flange pointing laterally outwards, wherein the two flanges have a fixing surface parallel to the support surface on a side facing away from the support surface. On a side facing away from the support side, the profile cross-section of the leg accordingly has a type of foot which could extend laterally inwardly or outwardly. To increase the stability, it is preferred if the foot is oriented laterally outwardly. The fixing surface arranged thereon may be placed on or against the vehicle structure in order to perform a fixing. The size of the flange restricts or allows the fixing means which may be used. The flange could have a row of bores spaced apart from each other, through which fixing means may be inserted which in turn can be connected to the vehicle structure.

The rail cross-section could be rounded in the region of the support side between the legs. The rounding causes significantly lower notch forces than in profile cross-sections with sharp/angular transitions. The rounding may be restricted to just a partial region of a transition, or it may cover the complete space available between the legs.

In a particularly advantageous embodiment, the profile cross-section has a curved transitional portion of constant form extending completely between the legs. The transitional portion accordingly creates a space on a side of the two legs facing the support side, with a face oriented towards the support surface, in the form of an inverted trough. The transitional portion is thus arcuate or dome-shaped and leads to a very harmonious transfer of forces within the rail cross-section.

An advantageous embodiment comprises at least one first fixing insert, wherein the rail body has at least one first passage bore extending from the support surface in the direction of the fixing side, wherein the at least one first fixing insert has a retaining body with a stop face adapted to the rail cross-section and a bush extending from the stop face and having an internal thread and an outer diameter adapted to the first passage bore, and wherein the at least one first fixing insert is configured to be pushed through the passage bore from a side of the rail body facing away from the support surface, so that the stop face lies flush on a region of the rail cross-section. This may relate to a form of the rail cross-section described above. In particular, it is suitable to consider the fully rounded rail cross-section for this. The at least one first fixing insert has a face which can be inserted flush into the intermediate space between the legs and then lies closely against the profile cross-section in the direction of the support surface. By means of the bush, a fixing means can be pushed through the support surface and screwed into the bush. The retaining body is accordingly drawn by tensile force in the direction of the support surface and thereby pressed against the profile cross-section. The transferable force significantly exceeds that which would be possible with a bush screwed into the support surface, so that the retention is secure and robust. The contact pressure on the profile cross-section distributes the force superficially, and the retaining body can be oriented on the profile cross-section without tilting. In particular with the fully rounded design, seizing or tilting can thus be prevented.

A further advantageous embodiment comprises at least one second fixing insert, wherein the at least one second fixing insert comprises a bush with an internal thread, and wherein the at least one second fixing insert can be screwed on, in or to the rail body. This particularly simple embodiment could be used to integrate a rail attachment as will be explained below, which is bolted to the rail body in a regular matrix pattern.

It is evident that the first rail body may also be equipped with several groups of fixing inserts which may comprise both the first and also the second fixing inserts.

Preferably, the rail system furthermore comprises at least one elongate rail attachment which can be placed on the support surface of the rail body and connected to the rail body via fixing inserts, and is configured to retain fittings at different positions along the rail attachment. The rail attachment may accordingly be configured to allow fixings at different positions. For this, certain form features, openings, undercuts, guide devices or similar may be used.

The at least one rail attachment may have at least one seat rail attachment which has a cavity enclosed between two side faces running parallel to each other and an outer face running transversely thereto, wherein the outer face has a continuous slot punctuated by mutually spaced bores which have a diameter exceeding the clear width of the slot. Accordingly, conventional devices may be used for fixing seats to seat rails. These could have mushroom-like latching bar bodies which can be introduced into the openings and displaced along the slot. Constricted regions are present between the openings, at which the latching bar bodies with rail attachment can be clamped. Thus the first elongate rail body with this rail attachment has a similar form to a conventional seat rail. If required, in the cabin concerned, a conventional seat rail could be produced which allows fixing of passenger seats with conventional means.

However, the at least one rail attachment may have at least one slide rail attachment having an undercut running in a main extension direction of the slide rail attachment for sliding guidance. The slide rail attachment in particular serves to receive fittings which could require a reconfiguration of the cabin. By the design of the slide rail, a continuous movement along the slide rail is possible, and adequate fixing may take place by clamping or engagement in certain positions. Seats or seat frames may be pushed along the main extension direction of the cabin and locked at different positions.

For this, the at least one slide rail attachment may have at least one fixing means for fixing fittings to the slide rail attachment. A suitable fixing means could for example be a bore oriented towards the support surface of the rail body and in which a latching bar or locking body can be introduced vertically. Due to the undercut of the slide rail attachment, the component to be fixed cannot lift away from the slide rail. Engagement in such an engagement opening may also prevent sliding.

The rail system according to an embodiment of the invention may furthermore comprise at least one bridge element which is configured to be connected to the legs on the fixing side of the rail body. The bridge element accordingly connects the two legs together and may close the profile cross-section at least locally. This further increases the stability.

The at least one bridge element may comprise several strip-like bridge elements arranged in a main extension direction of the rail body, spaced apart from each other and running transversely to the legs. Thus the profile cross-section may be closed at regular intervals. This allows simple adaptation to fittings below the rail body. The attachment of these bridge elements could be restricted to regions in which a particularly high load is expected.

The at least one bridge element could however also be formed to be elongate and have a width which corresponds to the spacing of the legs on the fixing side. Thus, a continuous closure of the profile cross-section could be achieved at least in a specific region.

For this, the at least one bridge element may have two flanges which run parallel to each other and are spaced apart from each other, and which can be connected to the legs. In fitted state, the flanges may point from the fixing side towards the support side. Fixing of the flanges to the legs may take place by form-fit or material-fit methods such as riveting, screwing, welding, gluing or similar.

The bridge element may be equipped with a holder for receiving lines. The holder may comprise a clamp. Such a holder may be formed integrally with the bridge element or be attached thereto, for example by gluing, screwing, welding or by other form-fit, force-fit and material-fit connecting methods. Furthermore, a plurality of bridge elements may also be used which are distributed on the rail body solely to provide a respective bracket. It is conceivable to configure such bridge elements so as to snap-in or latch between the legs of the rail body. The bridge elements may be made from a plastic or a metal material.

The invention furthermore concerns an aircraft having a floor structure and a cabin formed thereon, and at least one rail system according to the description above, wherein the cabin is formed on or attached to the floor structure.

BRIEF DESCRIPTION OF THE DRAWINGS

Further features, advantages and possible applications of the present invention arise from the following description of exemplary embodiments and the figures. All features described and/or shown in the figures form the subject of the invention, either alone or in arbitrary combination, and independently of their combination in the individual claims or their back references. In the figures, the same reference signs designate the same or similar objects.

FIGS. 6a and 6b show a profile cross-section with bridge element arranged thereon, wherein

DETAILED DESCRIPTION

Figure 1:
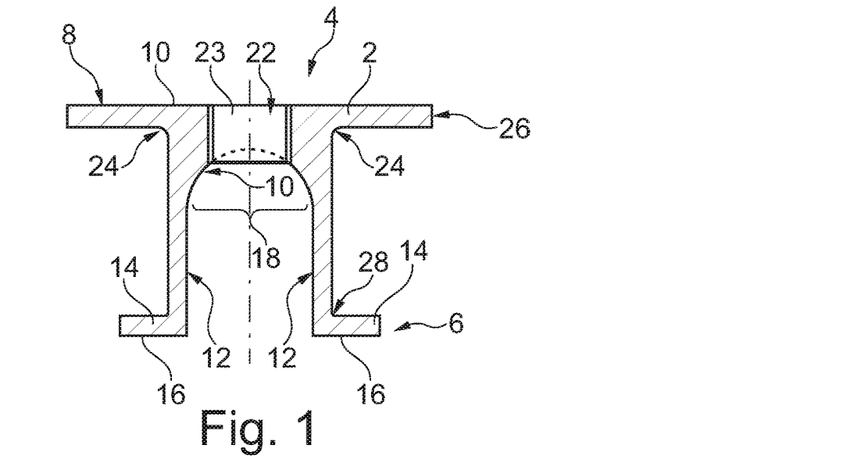
FIG. 1 shows a profile cross-section of a first elongate rail body with fixing inserts installed therein.

FIG. 1 shows a profile cross-section 2 of a first elongate rail body 4. A fixing side 6 is provided for fixing to a vehicle structure. Opposite this is a support side 8 having a support surface 10. Fittings to be installed may be placed thereon and attached.

The rail cross-section 2 has two legs 12 which lie opposite each other and are spaced apart from each other, and each run perpendicularly to the support surface 10. In the region of the fixing side, the legs 12 have outward flanges 14 which have a fixing surface 16 parallel to the support surface 10. The fixing surfaces may be laid against a primary structure of the vehicle in order then to fix the rail body to the structure via suitable fixing means.

In a region between the legs 12 and facing the support side 8, a transitional region 18 is arranged which for example is completely rounded. This means that the transitional portion 18 has a constantly shaped, trough-like curved surface 20. This is for example round.

For fixing fittings (not shown), fixing inserts 22 are provided which are arranged spaced apart from each other in a longitudinal extent of the rail body 4. In the example shown in FIG. 1, only one bush is shown as a fixing insert 22 with threaded opening 23, which for example terminates flush with the support surface 10.

The top side, i.e. the support side 8, of the profile cross-section 2 is for example formed as a strip running parallel to the two flanges 14. The dimensions of this component may be selected according to application. These include for example the distance between the flanges 14 and the strip 26, the distance between the legs 12, the clear width of the flange 14, and the width of the strip 26.

It should be emphasized in particular that, to avoid notch stresses, for example an external transition between the legs 12 and the strip 26 has a rounding 24. The same could apply to the transition between the legs and the flanges 14 in the form of a rounding 28.

Figures 2A, 2C:
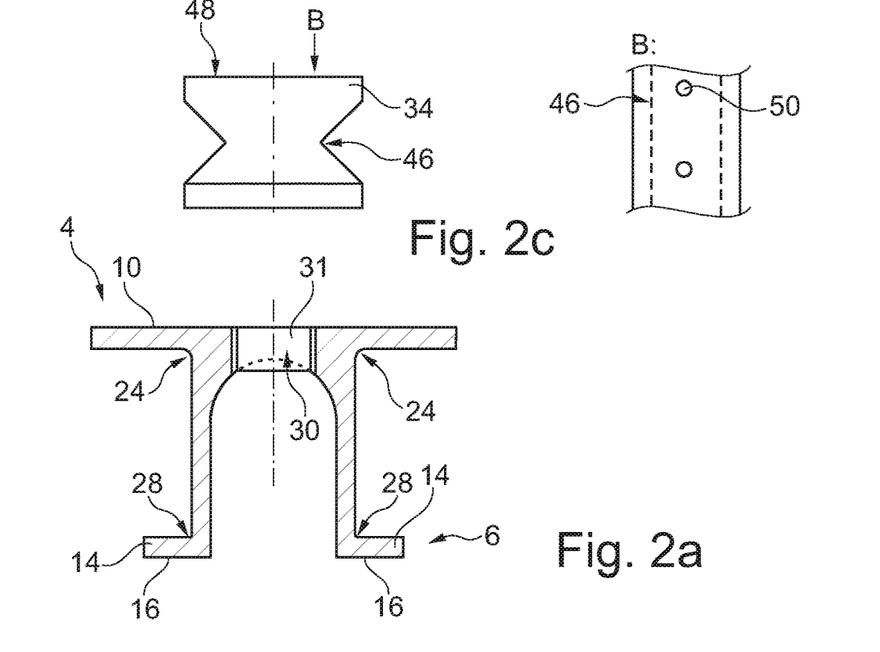
FIGS. 2a to 2c show a first rail body with fixing inserts installed therein and with two different rail attachments.
Figure 2B:
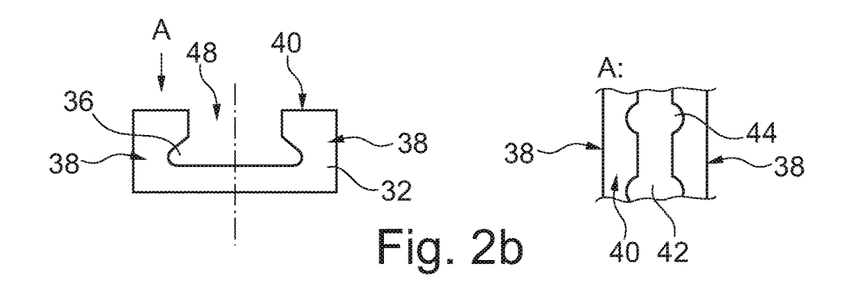

FIGS. 2a to 2c show a first rail body 4 with a fixing insert 30, which for example is dimensioned slightly smaller than the fixing insert 22 in FIG. 1, and has a bore 31 with an internal thread.

FIGS. 2b and 2c are depicted above FIG. 2a and are intended to show that the various rail attachments 32 and 34 can be attached to the support surface 10. FIG. 2b shows for example a rail attachment 32 as a seat rail attachment, which has a cavity 36 enclosed between two side faces 38 running parallel to each other and an outer face 40 running transversely thereto. The outer face 40 is provided with a continuous slot 42 punctuated by mutually spaced bores 44 (detail view A). Thus a conventional seat rail may be formed. This may be known as an ATLAS rail.

FIG. 2c shows the rail attachment 34 as a slide rail attachment with an undercut 46. With this, a sliding guidance can be achieved very easily, wherein an outer face 46 may be punctuated for example by individual engagement openings 50 (see detail view B).

Figure 3:
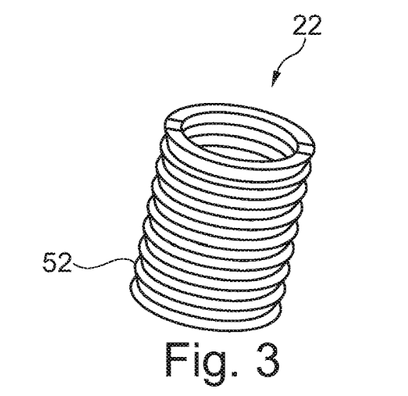
FIG. 3 shows diagrammatically a fixing insert in a three-dimensional depiction.

FIG. 3 shows the fixing insert 22 which for example has a thread 52 via which it can be attached to the rail body 4. The rail body 4 may have an internal thread for receiving the fixing insert 22 if the latter is fully equipped with an external thread. However, it would also be conceivable to use a lock nut if the fixing insert 22 extends completely through the rail body 4. A press fit would also be conceivable. The fixing insert could furthermore be glued, also in combination with a screw fitting.

Figure 4A:
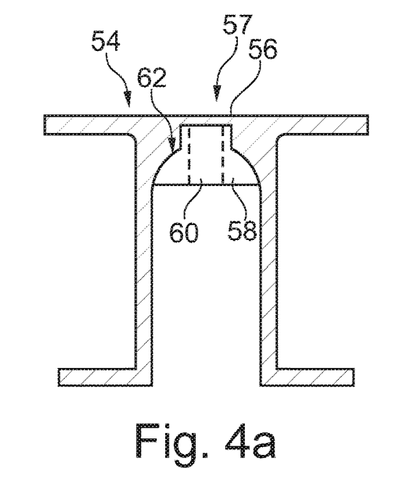
FIGS. 4a and 4b show a fixing insert with a retaining body and a bush.

FIG. 4a shows an alternative first rail body 54 punctuated by several passage bores 56, in which a fixing insert 57 with a retaining body 58 may be placed. This is positioned between the legs 12 at the corresponding passage bore 56, and has an internal thread 60 in which a screw fitting can be screwed. The resulting tensile force presses a stop face 62 of the retaining body against the transitional region 18. For example, the stop face 62 is configured to be partially cylindrical, so that the retaining body 58 can be correctly oriented when the screw fitting is screwed in.

Figure 4B:
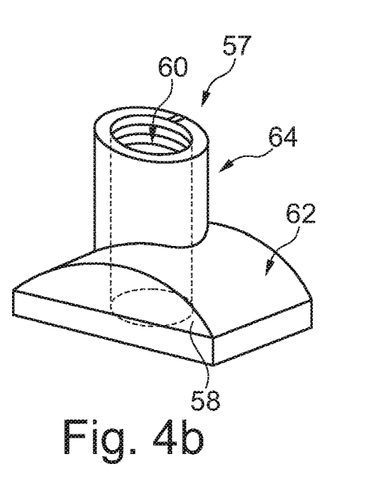

FIG. 4b shows the retaining body 58 in a three-dimensional depiction. This shows the partially cylindrical stop face 62, from which a bush 64 extends outwardly. This may be pushed through the corresponding passage bore 56 and is accessible from the support surface 10.

Figure 5A:
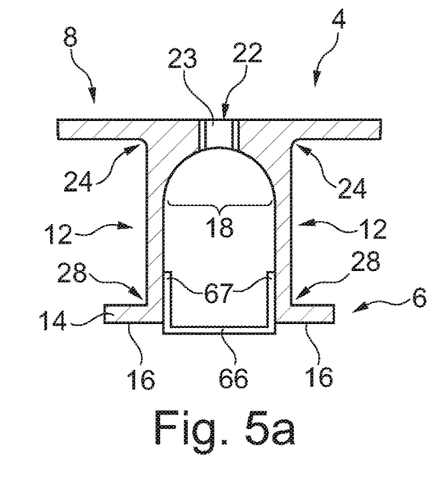
FIGS. 5a and 5b show a profile cross-section with bridge element arranged thereon.
Figure 5B:
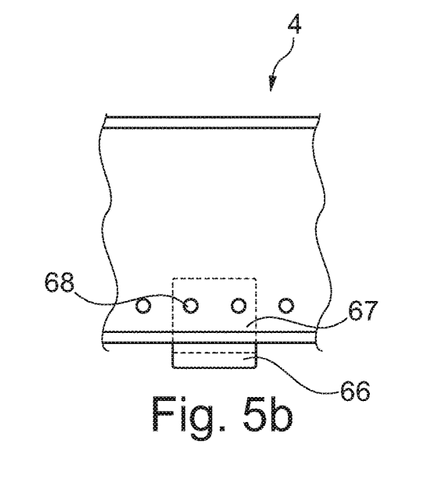

FIGS. 5a and 5b show a slight modification of the first rail body 4 from FIG. 1. Here, bridge elements 66 can be seen which are connected to the legs 12 in an intermediate space between the legs 12 on the fixing side 6. A bridge element may have an angular flange 67 at opposite ends which can be connected to the legs 12. This creates a profile cross-section which is at least locally completely closed.

As FIG. 5b shows, individual bridge elements 66 may be used which are configured merely strip-like and attached at just a few points. For fixing, fixing means 68 may be used which are for example rivets or screws.

Figure 6A:
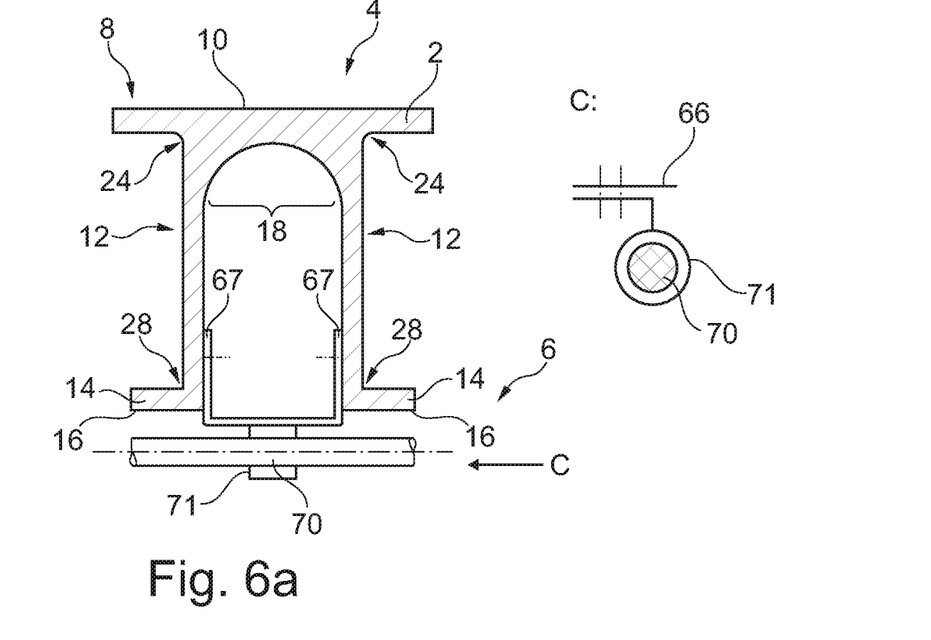

FIG. 6a shows the exemplary embodiment in FIG. 5a which in modified form is suitable for holding cables or other lines. The bridge element 66 may consequently have one or more holders 71 which hold a line 70. A holder 71 may be implemented in the form of a clip and is indicated in partial section in FIG. 6a.

Figure 6B:
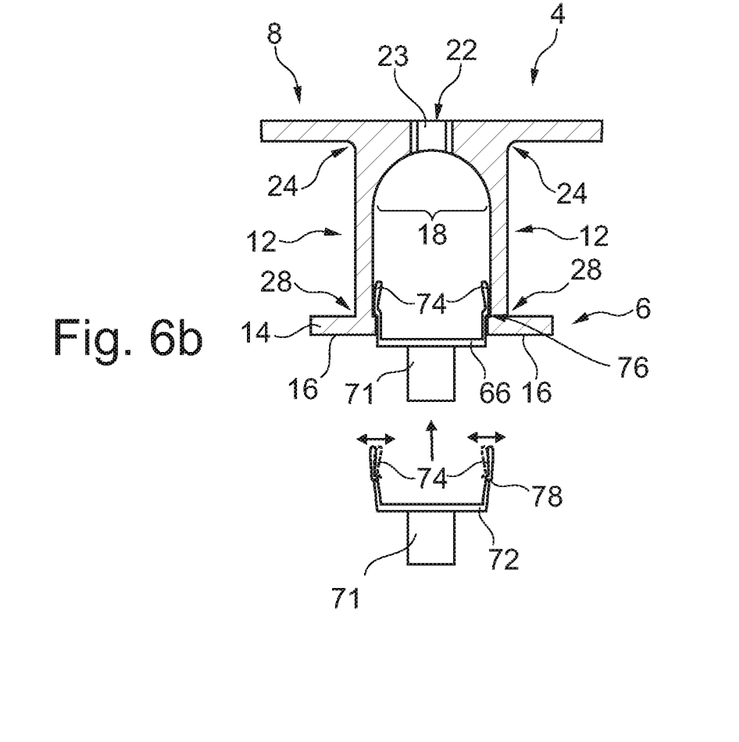
FIG. 6b shows a snap-in bridge element.

FIG. 6b shows a bridge element 72 which has an elastic flange 74 equipped with a preload. The bridge element 72 is configured such that when the bridge element 72 is relaxed, the flanges 74 are spaced further apart than the two legs 12 of the rail body 4. A pressure force acting from the outside loads the two flanges 74 so they can be inserted between the legs 12 and then press laterally outward again into the relaxed position. In this way, the bridge element 72 may be held on the rail body 4.

As an improvement, on the inside of the legs 12, the rail body 4 may have a shoulder 76 on mutually facing sides which corresponds to a form feature of the bridge element 72. This may be a protrusion or a bulge 78.

Figure 7:
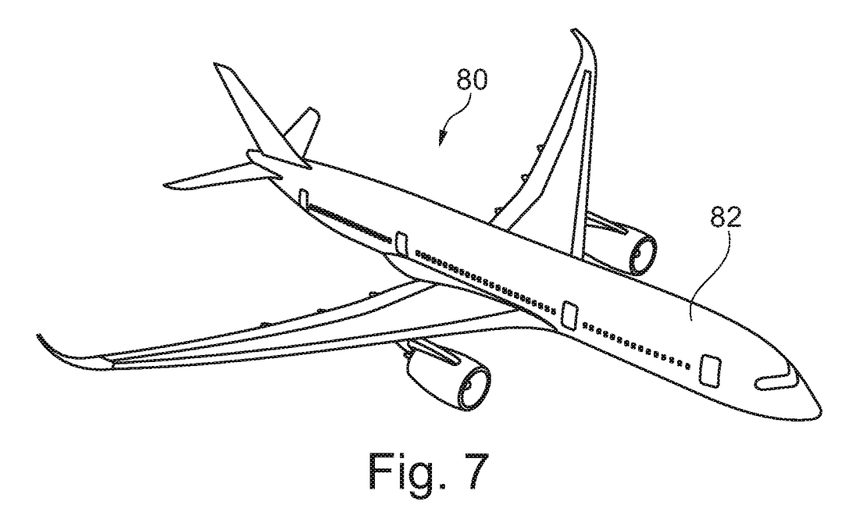
FIG. 7 shows an aircraft with a cabin in which at least one first elongate rail body is installed.

Finally, FIG. 7 shows an aircraft 80 equipped with a cabin 82 in which at least one rail system according to the invention is arranged.

Finally, it is pointed out that the term "comprising" does not exclude any other elements or steps, and the term "a" or "one" does not exclude a plurality. It is also pointed out that features described with reference to one of the above-mentioned exemplary embodiments may also be used in combination with other features of other exemplary embodiments described above. Reference signs in the claims should not be regarded as a restriction.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A rail system for fixing fittings in a cabin of a vehicle, comprising:
    a first elongate rail body with a fixing side for fixing to a vehicle structure, an opposite support side with a support surface for receiving the fittings, and a rail cross-section extending between the fixing side and the support side;
    a plurality of fixing inserts configured to be fixed along the support surface; and
    at least one bridge element configured to be connected to the two mutually opposing legs on the fixing side of the rail body,
    wherein the rail cross-section has the two mutually opposing legs spaced apart from each other and each running perpendicularly to the support surface, and
    wherein the plurality of fixing inserts is configured so as not to protrude beyond the support surface.

2. The rail system according to claim 1, wherein the two mutually opposing legs each have a flange pointing laterally outwards, and wherein the flange has a fixing surface parallel to the support surface on a side facing away from the support surface.

3. The rail system according to claim 1, wherein the rail cross-section is rounded a region of the support side between the two mutually opposing legs.

4. The rail system according to claim 1, wherein the rail cross-section has a curved transitional portion of constant form, extending completely between the two mutually opposing legs.

5. The rail system according to claim 1, the plurality of fixing inserts comprises at least one first fixing insert,
    wherein the rail body has at least one first passage bore extending from the support surface in a direction of the fixing side,
    wherein the at least one first fixing insert has a retaining body with a stop face adapted to the rail cross-section and a bush extending from the stop face and having an internal thread and an outer diameter adapted to the first passage bore, and
    wherein the at least one first fixing insert is configured to be pushed through the passage bore from a side of the rail body facing away from the support surface, so that the stop face lies flush on a region of the rail cross-section.

6. The rail system according to claim 1, wherein the plurality of the fixing inserts comprises at least one second fixing insert,
    wherein the at least one second fixing insert comprises a bush with an internal thread, and
    wherein the at least one second fixing insert is configured to be screwed on, in or to the rail body.

7. The rail system according to claim 1, further comprising at least one elongate rail attachment configured to be placed on the support surface of the rail body and connected to the rail body via at least one of the plurality of fixing inserts, and is configured to retain the fittings at different positions along the rail attachment.

8. The rail system according to claim 7, wherein the at least one rail attachment has at least one seat rail attachment having a cavity enclosed between two side faces running parallel to each other and an outer face running transversely thereto, wherein the outer face has a continuous slot punctuated by mutually spaced bores having a diameter exceeding a clear width of the slot.

9. The rail system according to claim 1, wherein the at least one bridge element comprises a plurality of bridge elements arranged in a main extension direction of the rail body, spaced apart from each other and running transversely to the two mutually opposing legs.

10. The rail system according to claim 9, wherein the at least one bridge element has two flanges running parallel to each other and are spaced apart from each other, and configured to be connected to the two mutually opposing legs, respectively.

11. The rail system according to claim 1, wherein the at least one bridge element is formed to be elongate and has a width corresponding to the spacing of the two mutually opposing legs on the fixing side.

12. The rail system according to claim 1, further comprising at least one bridge element configured to be connected to the two mutually opposing legs on the fixing side of the rail body.

13. An aircraft having a floor structure and a cabin formed thereon, and at least one rail system according to claim 1 formed on or attached to the floor structure.

14. A rail system for fixing fittings in a cabin of a vehicle, comprising:
    a first elongate rail body with a fixing side for fixing to a vehicle structure, an opposite support side with a support surface for receiving fittings, and a rail cross-section extending between the fixing side and the support side;
    a plurality of fixing inserts configured to be fixed along the support surface; and
    at least one elongate rail attachment configured to be placed on the support surface of the rail body and connected to the rail body via at least one of the plurality of fixing inserts, and is configured to retain the fittings at different positions along the rail attachment, wherein the rail cross-section has two mutually opposing legs spaced apart from each other and each running perpendicularly to the support surface, wherein the plurality of fixing inserts is configured so as not to protrude beyond the support surface, and wherein the at least one rail attachment has at least one slide rail attachment having an undercut running in a main extension direction of the slide rail attachment for sliding guidance.

15. The rail system according to claim 14, wherein the at least one slide rail attachment has at least one fixing means for fixing fittings to the slide rail attachment.

16. The rail system according to claim 14, wherein the two mutually opposing legs each have a flange pointing laterally outwards, and wherein the flange has a fixing surface parallel to the support surface on a side facing away from the support surface.

17. The rail system according to claim 14, wherein the rail cross-section is rounded in the region of the support side between the two mutually opposing legs.

18. The rail system according to claim 14, wherein the rail cross-section has a curved transitional portion of constant form, extending completely between the two mutually opposing legs.

19. The rail system according to claim 14, wherein the plurality of fixing inserts comprises at least one first fixing insert, wherein the rail body has at least one first passage bore extending from the support surface in the direction of the fixing side, wherein the at least one first fixing insert has a retaining body with a stop face adapted to the rail cross-section and a bush extending from the stop face and having an internal thread and an outer diameter adapted to the first passage bore, and wherein the at least one first fixing insert is configured to be pushed through the passage bore from a side of the rail body facing away from the support surface, so that the stop face lies flush on a region of the rail cross-section.

20. The rail system according to claim 14, wherein the plurality of the fixing inserts comprises at least one second fixing insert, wherein the at least one second fixing insert comprises a bush with an internal thread, and wherein the at least one second fixing insert is configured to be screwed on, in or to the rail body.

* * * * *